United States Patent [19]

Yoshikawa

[11] Patent Number: 5,319,387
[45] Date of Patent: Jun. 7, 1994

[54] APPARATUS FOR SPECIFYING COORDINATES OF A BODY IN THREE-DIMENSIONAL SPACE

[75] Inventor: Kouhei Yoshikawa, Nara, Japan

[73] Assignee: Sharp Kabushiki Kaisha, Osaka, Japan

[21] Appl. No.: 870,688

[22] Filed: Apr. 17, 1992

[30] Foreign Application Priority Data

Apr. 19, 1991 [JP] Japan .................................. 3-088394
Apr. 16, 1992 [JP] Japan .................................. 4-096455

[51] Int. Cl.$^5$ .............................................. G09G 5/00
[52] U.S. Cl. ...................................... 345/179; 273/438
[58] Field of Search ....................... 340/709, 707, 706; 364/709.01, 709.11; 273/148 B, 438; 358/88, 93, 107

[56] References Cited

U.S. PATENT DOCUMENTS

| | | | |
|---|---|---|---|
| 3,898,445 | 8/1975 | MacLeod | 364/709.11 |
| 4,553,842 | 11/1985 | Griffin | 340/706 |
| 4,613,866 | 9/1986 | Blood | 324/461 |
| 4,811,004 | 3/1989 | Person | 340/706 |
| 4,928,175 | 5/1990 | Haggren | 358/107 |
| 5,012,049 | 4/1991 | Schier | 340/707 |
| 5,073,770 | 12/1991 | Lowbner | 340/709 |
| 5,148,016 | 9/1992 | Murakami | 340/709 |

FOREIGN PATENT DOCUMENTS

| | | | |
|---|---|---|---|
| 0211637 | 12/1982 | Japan | 340/706 |
| 0211242 | 12/1983 | Japan | 340/706 |

OTHER PUBLICATIONS

"How Far Virtual Reality Will Be Realized Journal of the Japan Society of Mechanical Engineers vol. 93, No. 863" Oct. 1990, pp. 72–78.

Generation of Artificial Reality, System/Control/Information, vol. 33 No. 11 Virtual Environment, the 6th Human Interface Symposium (1990) Oct. pp. 1–18.

(Nikkei Industrial Newspaper Jan. 24, 1991) Small-size Wireless Mouse Using Infrared Ray Developed by Digital Stream.

Primary Examiner—Jeffery Brier
Assistant Examiner—Bryan S. Tung
Attorney, Agent, or Firm—Birch, Stewart, Kolasch & Birch

[57] ABSTRACT

An apparatus for specifying three-dimensional coordinates of a body includes an image position sensing unit for converging a light radiating from a specific body arranged in a space on a plane to form an image and detecting a position of the image on the plane, one or a plurality of mirrors for reflecting the light from the specific body to allow the reflected light to enter the image position sensing unit, and a coordinate calculating unit for calculating coordinates of the specific body in a three-dimensional coordinate system defined in a three-dimensional space based on the positions of the images respectively formed by a light radiating from the specific body and directly entering the image position sensing unit and a light reflected by the mirror and entering the image position sensing unit.

18 Claims, 12 Drawing Sheets

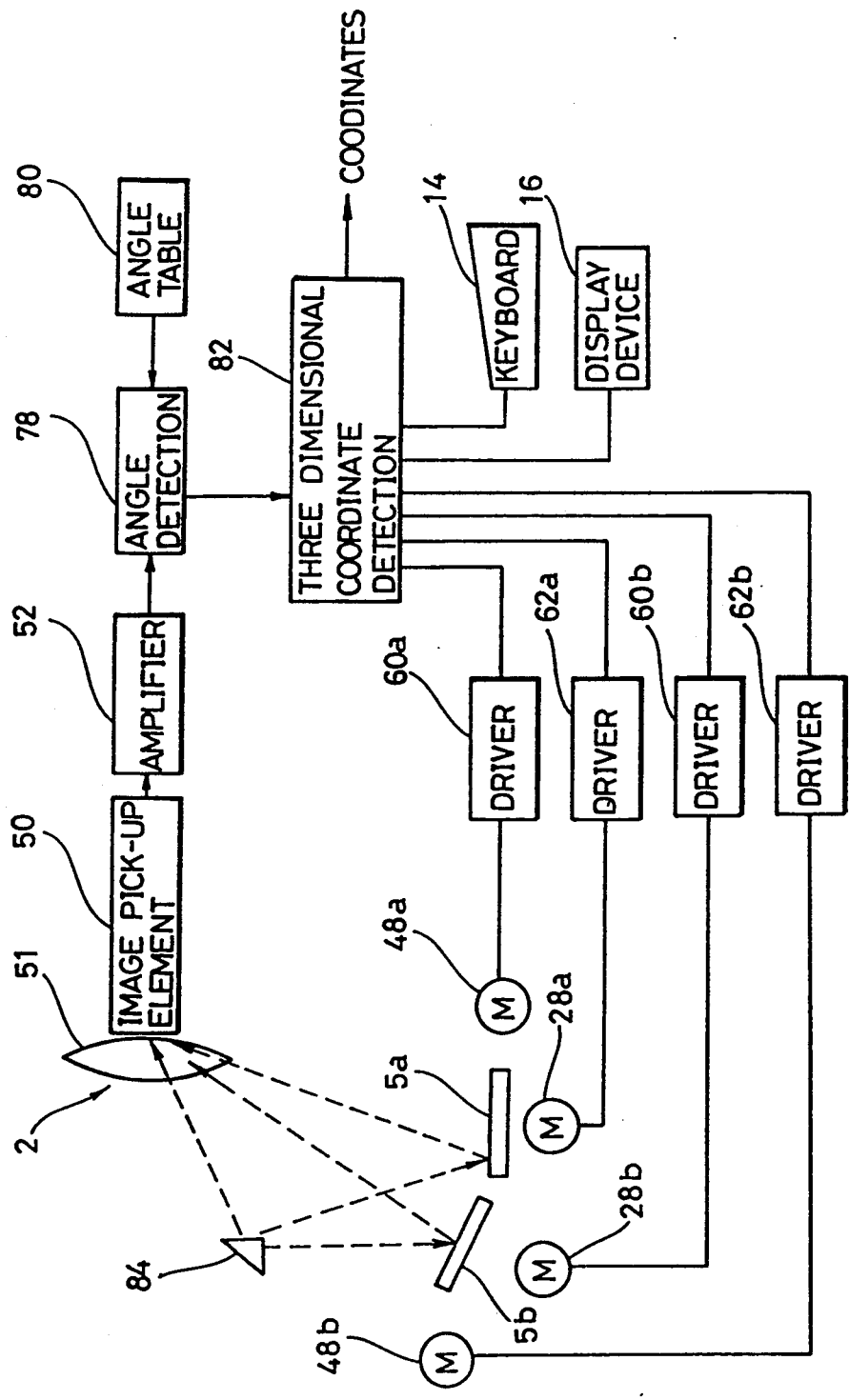

APPARATUS FOR SPECIFYING COORDINATES OF A BODY IN THREE-DIMENSIONAL SPACE

BACKGROUND OF THE INVENTION

1. Field of the Invention

The present invention relates generally to a system for use in information apparati such as computers and measuring apparati, for specifying coordinates of a body in three-dimensional space, and more particularly, it relates to an improvement in a technique for specifying coordinates of a body by using radiation of light and the like.

2. Description of the Related Art

With the development of electronic technology in the field of computers etc., systems employing three-dimensional space have been increased in number. The most typical one of such systems is the virtual reality (hereinafter referred to as "VR") system.

The VR system enables a person to have a similar experience in artificial reality to a real experience. The following literatures describe such virtual reality:

(1) "Virtual Environment" by Michitaka Hirose, Proceedings of the 6th Human Interface Symposium (1990);

(2) "Generation of Artificial Reality" by Michitaka Hirose, *System/Control/Information*, vol. 33, No. 11, pp. 590-597 (1989); and (3) "How Far Virtual Reality Will Be Realized" by Michitaka Hirose, Journal of the Japan Society of Mechanical Engineers, vol. 93, No. 863, pp. 72-78 (1990)

For the VR system, it is essentially important to input a position and posture of a person to the system with accuracy and at a high speed. Various attempts have been made to accurately specify coordinates of a person at high speed.

FIG. 1 shows one example of such a VR system employing coordinate input system. The system is described in the above-described literature (1).

With reference to FIG. 1, the VR system includes a space sensor 102 attached to the head of a person 100, liquid crystal glasses 104 which the person 100 puts on, a data glove 106 which the person 100 puts on his hand, a space sensor controller 108 for controlling the space sensor 102, a data glove controller 110 for controlling the data glove 106, a graphics and world controller 112 for subjecting a world model 128 to predetermined processing to adapt virtual reality to the person's movements according to a position and posture of the person and a position and posture of his finger input respectively from the space sensor controller 108 and the data glove controller 110, a stereo display controller 114 for producing video to be applied to the person 100 based on the world model 128, a stereo display 116 for performing stereoscopic display of a virtual body 118 in response to a signal applied from the stereo display controller 114, a synchronization signal transmitter 126 for alternately opening/closing right and left liquid crystal shutters of the liquid crystal glass 114 in synchronization with a display cycle of the virtual body 118 in response to a synchronization signal from the stereo display controller 114, a halfmirror 120 disposed in front of the person 100, and a force feedback controller 124 for controlling a force feedback head 122 such that force is applied against the data glove 106 and the hand of the person 100 according to the world model 128.

The VR system shown in FIG. 1 operates as follows. The space sensor 102 and the space sensor controller 108 detects position/posture of the head of the person 100 and applies their three-dimensional coordinates to the graphics and world controller 112. The data glove controller 110 detects movements of the person's (100) hand and applies information indicative of the posture and the position of the hand to the data glove controller 110. The data glove controller 110 processes the signal to generate a signal indicative of coordinates of a position of the person's (100) hand and a state of each articulation and applies the signal to the graphics and world controller 112.

The graphics and world controller 112 determines how to change the world model 128 based on the information indicative of position/posture of the head and the hand of the person 100 and the information of the world model 128 representing the former virtual reality. The world model 128 is subjected to a predetermined processing based on the determination.

The stereo display controller 114 generates stereoscopic video to be applied to the person 100 according to a new world model 128. The stereoscopic video signals includes a pair of video, one for the person's right eye and the other for the left eye. The stereo display 116 alternately displays the video for the right eye and video for the left eye at predetermined intervals. The displayed virtual body 118 is reflected by the halfmirror 120, which reflection enters the eye of the person 100 as a virtual body 132. At this time, the synchronization signal transmitter 126 opens the right side shutter of the liquid crystal glass 104 when the video for a right eye is displayed and the left side shutter when the video for a left eye is displayed, with the other shutter closed. As a result, the video for a right eye and the video for a left eye are respectively applied to the right eye and the left eye of the person 100. The person 100 recognizes the virtual body 132 as being stereoscopic.

The force feedback controller 124 determines reactive force to be applied to the hand of the person 100 according to the world model 128. The force feedback controller 124 operates the force feedback head 122 based on the determined reactive force to press the hand of the person 100 with the data glove 106 put thereon. As a result, the person 100 feels as if he actually touched the virtual body 132.

It is clear that finding the accurate position of the person 100 is important for the above-described VR system. For this, one used as the space sensor 102 is shown in FIG. 2. With reference to FIG. 2, the position detection system includes a source coil 134, a sensor coil 136, a detection circuit 138, a computer 140 and a drive circuit 142. Each of the source coil 134 and the sensor coil 136 includes three Helmholtz coils arranged orthogonal to each other.

The three coils of the source coil 134 generate magnetic field in a time divisional manner. The sensor coil 136 senses the magnetic field generated by the source coil 134. The output of the sensor coil 136 is detected by the detection circuit 138 and applied to the computer 140. The computer 140 computes spatial position and posture of the sensor coil 136 based on nine pieces of information (3×3) obtained from the output of the sensor coil 136. The computed information is output through the computer 140.

The system shown in FIG. 2, however, has following shortcomings. First, the system is incapable of detecting a position of a body in the entire space. Second, the system operates so slowly that movements of virtual reality cannot be precisely changed in accordance with the user's movements. Furthermore, in the system, when a metallic body exists in measurement space, a magnetic field change caused by the metallic body leads to an error in a measured value.

The data glove 106 for use in the system shown in FIG. 1 can also measure coordinates of a tip of a finger, for example.

With reference to FIG. 3, the data glove 106 includes a glove main body 144, a space sensor 146 attached to the back of the glove main body 144 such as shown in FIG. 2, and an optical fiber sensor 150 attached to the glove 144 along the respective fingers of the glove 144 by a fiber stopper 148. The optical fiber sensor 150 enables input equivalent to 2 degrees of freedom per finger, that is, the input equivalent to the total of 10 degrees of freedom to be obtained. Furthermore, an additional use of the space sensor 146 allows the data glove 106 to obtain information equivalent to 16 degrees of freedom including position/posture of the hand. Then, coordinates of a position of the tip of a predetermined finger can be specified by adding the output of the position sensor 146 and the multiplication of the output of the optical fiber sensor 150. Based on the same principle, a suit called a data suit has been made public which is capable of measuring movements of the entire body.

A device such as the data glove has an excellent function of converting minute movements into corresponding information. On the other hand, such device requires a power source to be supplied to a part itself for designating a spatial position and a sensor to be provided. As a result, the system is made large in scale as a whole. In addition, such device allows recognition of coordinates only in limited range of space.

Another attempt is a system as shown in FIG. 4. With reference to FIG. 4, the system includes a mouse pen 152 which can be freely moved in space by a person's hand and has a light emitting position 156, and two pairs of light receiving portions 154 for receiving a light from the light emitting portion 156. As each of the light receiving portions 154, a conventional camera can be used. The respective light receiving portions 154 in the system shown in FIG. 4 includes a lens 158 and a light receiving element 160. A filter 164 is provided on the light receiving element 160. The light receiving element 160 and the lens 158 are located to have their axes cross each other at a predetermined angle.

In the system shown in FIG. 4, a light from the light emitting portion 156 of the mouse pen 152 passes through the lenses 158 to enter the pair of light receiving elements 160. The incident angle of the light onto the light receiving element 160 is changed according to a position of the light emitting portion 156. The light incident angle can be found by the position of the image of the light emitting portion 156 formed on each light receiving element 160. A position of the light emitting portion 156 of the mouse pen 152 can be found based on the incident angle and a distance between the light receiving elements 160 on the principle of trigonometrical survey. The filter 164 serves to apply only light emitted from the light emitting portion 156, out of the incident lights, to the light receiving element 160.

The system shown in FIG. 4, however, requires two light receiving elements or cameras. This makes the device complicated and large in scale. In addition, when a distance between light receiving elements or cameras must be changed, it is difficult to adapt the system to new conditions with ease. Furthermore, the pen 152 for pointing out a specific point in space and having the light emitting portion 156 requires a power source to be provided therewith for operating the light emitting portion 156. In addition, the lens 158 and the light receiving element 160 arranged to have their axes crossing to each other at a predetermined angle has a narrow space wherein coordinates can be designated.

SUMMARY OF THE INVENTION

An object of the present invention is to provide an apparatus capable of designating an arbitrary point in a three-dimensional coordinate system to specify coordinates.

Another object of the present invention is to provide an apparatus capable of designating an arbitrary point in wide space in a three-dimensional coordinate system to specify its coordinates.

A further object of the present invention is to provide an apparatus employing a target point designating device movable in a three-dimensional coordinate system at a high degree of freedom to designate an arbitrary point in wide space, thereby specifying coordinates thereof.

An additional object of the present invention is to provide an apparatus which is capable of designating an arbitrary point in wide space in a three-dimensional coordinate system to specify coordinates thereof and is smaller in scale than a conventional apparatus.

An apparatus for specifying three-dimensional coordinates of a body according to the present invention includes an image position sensing unit for converging a light radiating from a specific body located in a predetermined region in three-dimensional space onto a predetermined plane to form image and detecting the position of the image on the predetermined plane, a mirror for reflecting the light radiating from the specific body to allow the reflected light to enter the image position sense unit, and a coordinate computation unit for computing coordinates of the specific body in a three-dimensional coordinate system defined in the three-dimensional space based on a position on the predetermined plane of image formed by a direct incident light reflected by the specific body and directly entering the image position sense unit, and a position on the predetermined plane of image formed by an indirect incident light reflected by the specific body and entering the image position sense unit via the mirror.

In this apparatus, part of a light radiating from a specific body located in a predetermined region in three-dimensional space directly enters the image position sensing unit. The remaining part of the light is reflected by the mirror and enters the image position sensing unit. The image position sensing unit converges the direct incident light and the indirect incident light to form images on the predetermined plane. The position of each image on the predetermined plane is detected by the image position sensing unit and applied to the coordinate computation unit. The coordinate computation unit computes coordinates of the three-dimensional coordinate system based on the position of the image formed by the direct incident light and the position of the image formed by the indirect incident light.

The above-described apparatus, with a mirror provided therein, enables three-dimensional coordinates of a specific body to be obtained through computation on the principle of the trigonometrical survey without providing two image position sense units. No necessity for two image position sense units arranged at predetermined position makes the structure of the apparatus simple.

According a preferred embodiment, a visible light is used as radiation for forming image. It is therefore possible to use an ordinary camera as the image position sensing unit. According to a further preferred embodiment, a mirror is held rotatably around a predetermined first axis. An angular position of the mirror about the first axis detected by a first angle detection unit is used for computation of coordinates. This enables a precise computation of three-dimensional coordinates and enables coordinates of an arbitrary point to be obtained in a space wider than that in a case where the mirror is fixed.

According to a still further preferred embodiment of the present invention, the mirror is held rotatable around a second axis which is not in parallel with the first axis. An angular position of the mirror around the second axis is detected by a second angle detection unit. Then, the output of the second angle detection unit is used for computation of three-dimensional coordinates of a specific body. This allows a mirror, posture of which is appropriately changed, to reflect a light from a specific body to allow the reflected light to enter the image position sense unit even when the specific body moves in a wide region in the three-dimensional space. As a result, a region is increased wherein measurement is possible, as compared with that in a case where the mirror is held rotatable only around one axis. Provision of a plurality of such mirrors and devices for rotating the mirror around one or a plurality of axes improves measurement precision. In addition, a use of a light emitting diode etc. for emitting a light with a predetermined wavelength facilitates a detection of an image position by the image position sense unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 15 is a system block diagram according to the second embodiment.

DESCRIPTION OF THE PREFERRED EMBODIMENTS

Figure 5:
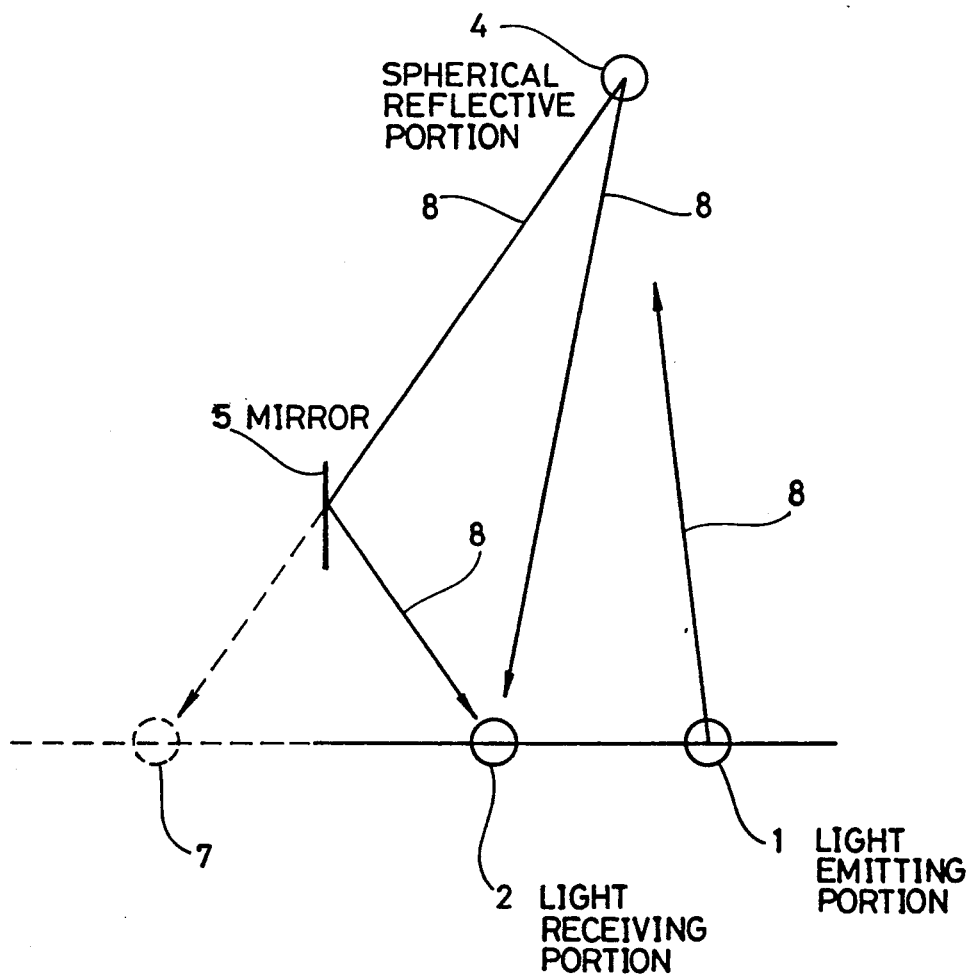
FIG. 5 is a schematic diagram showing the principle of the present invention.

With reference to FIG. 5, the principle of the present invention will be described. A spherical reflective portion 4 is used for pointing out an arbitrary position in space. Note that the portion 4 is not necessarily spherical. It may have any other curved surface. A device for specifying coordinates of the spherical reflective portion 4 according to the present invention includes a mirror 5 and a light receiving portion 2. The device may further include a light emitting portion 1 as of a device according to a first embodiment which will be described later.

A light 8 radiating from the light emitting portion 1 or other light source is reflected by the spherical reflective portion 4. Part of the reflected light directly reaches the light receiving portion 2. The remaining part of the reflected light is reflected by the mirror 5 and reaches the light receiving portion 2. Receiving the light, which is reflected by the mirror 5, by the light receiving portion 2 produces the same effect as obtained by providing a virtual light receiving portion 7 located symmetrically with the light receiving portion 2 centered around a plane defined by the surface of the mirror 5. A positional relationship between the mirror 5 and the light receiving portion 2 is known. A distance between the light receiving portion 2 and the virtual light receiving portion 7 can be also obtained by computation. It is therefore possible to find spatial coordinates of the spherical reflective portion 4 on the principle of trigonometrical survey based on the output of the light receiving portion 2 and the output (that is, a part of the output of the light receiving portion 2) of the virtual light receiving portion 7. The diameter of the spherical reflective portion 4 is selected to be as small as possible and the thickness of the optical beam is selected to be approximate to the diameter of the spherical reflective portion 4.

This computation requires an incident angle of the light 8 entering the light receiving portion 2 and the virtual light receiving portion 7 and a distance therebetween. If the mirror 5 is fixed, the distance between the light receiving portion 2 and the virtual light receiving portion 7 can be easily found. In addition, the mirror 5 is not necessarily fixed but it may be rotated around two axes orthogonal to each other assumed on the surface of the mirror. As a result, even if the spherical reflective portion 4 moves in wider space, the reflected light can be precisely directed to the light receiving portion 2, thereby specifying spatial coordinates of an arbitrary point in the wider space. In this case, however, it is necessary to calculate a distance between the light receiving portion 2 and the virtual light receiving portion 7 by using not only a positional relationship between the mirror 5 and the light receiving portion 2 but also a rotation angle of the mirror 5.

With reference to FIG. 5, the light emitting portion 1 is not indispensable to the apparatus of the present invention. When natural light enters from the surrounding environment, the spherical reflective portion 4 reflects these lights. Image processing using a camera as the light receiving portion 2 to determine a position of the image of the spherical reflective portion 4 obtains spatial coordinates of the spherical reflective portion 4 on the above-described principle without using the light emitting portion 10.

In addition, theoretical system shown in FIG. 5 includes only one mirror. The system, however, may include a plurality of mirrors. The configuration of the mirror 5 is not limited to that of planar type as shown in FIG. 5 but may be other configuration such as cylindrical type. If the mirror 5 is fixed, it should be made larger in area than that of a mirror rotatable to some extent. An enlarged mirror 5 enables spatial coordinates of an arbitrary point to be obtained in wider space even if it is fixed.

If the mirror 5 is rotatable around two axes as described above, coordinates can be input in a wider range than that of a case where the mirror 5 is fixed. The reason thereof is as follows. When the spherical reflective portion 4 moves comparatively widely, the reflection point of the light 8 on the mirror 5 is shifted following the direction of the movement of the spherical reflective portion 4. At this time, the mirror 5 is rotated manually or automatically to change its posture such that the reflection point draws near to the central portion of the mirror 5. As a result, even if the spherical reflective portion 4 moves in an extremely wide range, a direct incident light and a reflected incident light accurately enter the light receiving portion 2. The rotation angle of the mirror 5 can be also found with ease. It is therefore possible to accurately calculate the coordinates on the principle of a trigonometrical survey even if the spherical reflective portion 4 moves in wider space.

Figure 6:
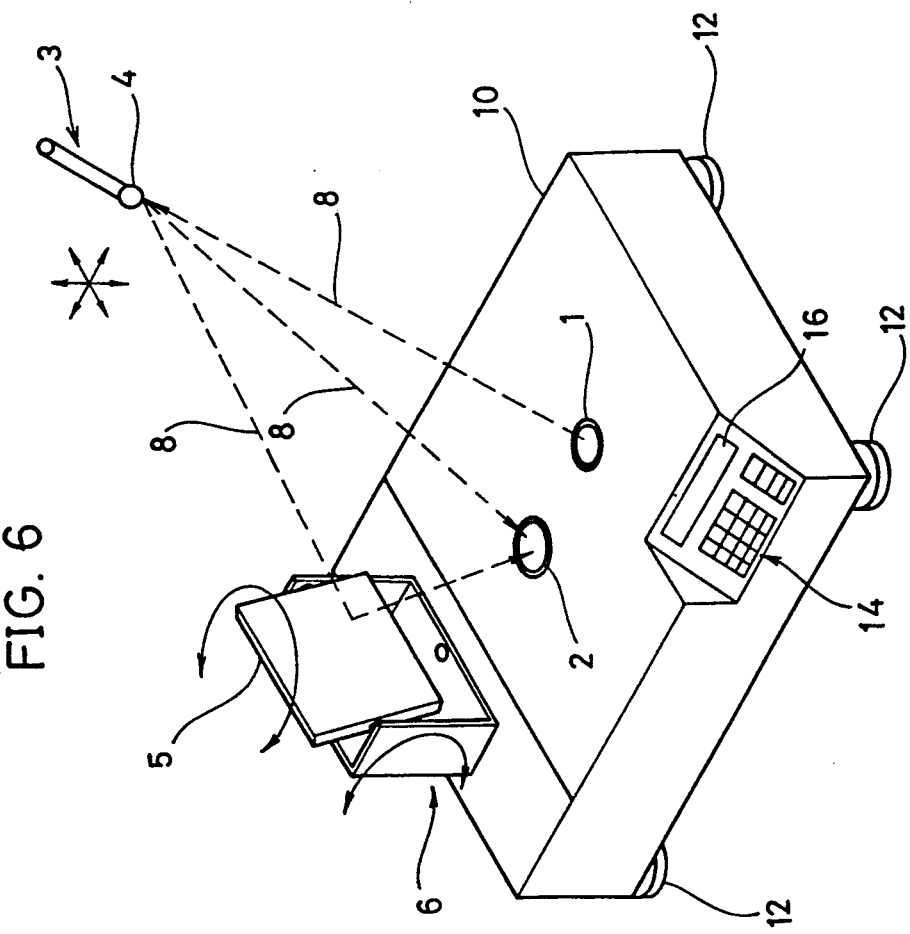
FIG. 6 is a perspective view of an apparatus according to one embodiment of the present invention.

FIG. 6 is a perspective view of the apparatus for specifying spatial coordinates according to a first embodiment of the present invention. With reference to FIG. 6, the apparatus includes a frame 10 having four legs 12, a light emitting portion 1 and a light receiving portion 2 provided spaced apart from each other by a predetermined distance at the center of the upper surface of the frame 10, a keyboard 14 and a display device 16 provided in the right front portion of the frame 10, a mirror rotating device 6 provided at the upper left side of the frame 10 for supporting a mirror 5 so as to be rotatable around the axis perpendicular to the upper surface of the frame 10 and an axis orthogonal to said axis and for rotating the mirror 5 around the above-described two axis, and a three-dimensional mouse 3 to be held by a user to point out an arbitrary point. The tip of the three-dimensional mouse 3 is provided with a spherical reflective portion 4.

Figure 7:
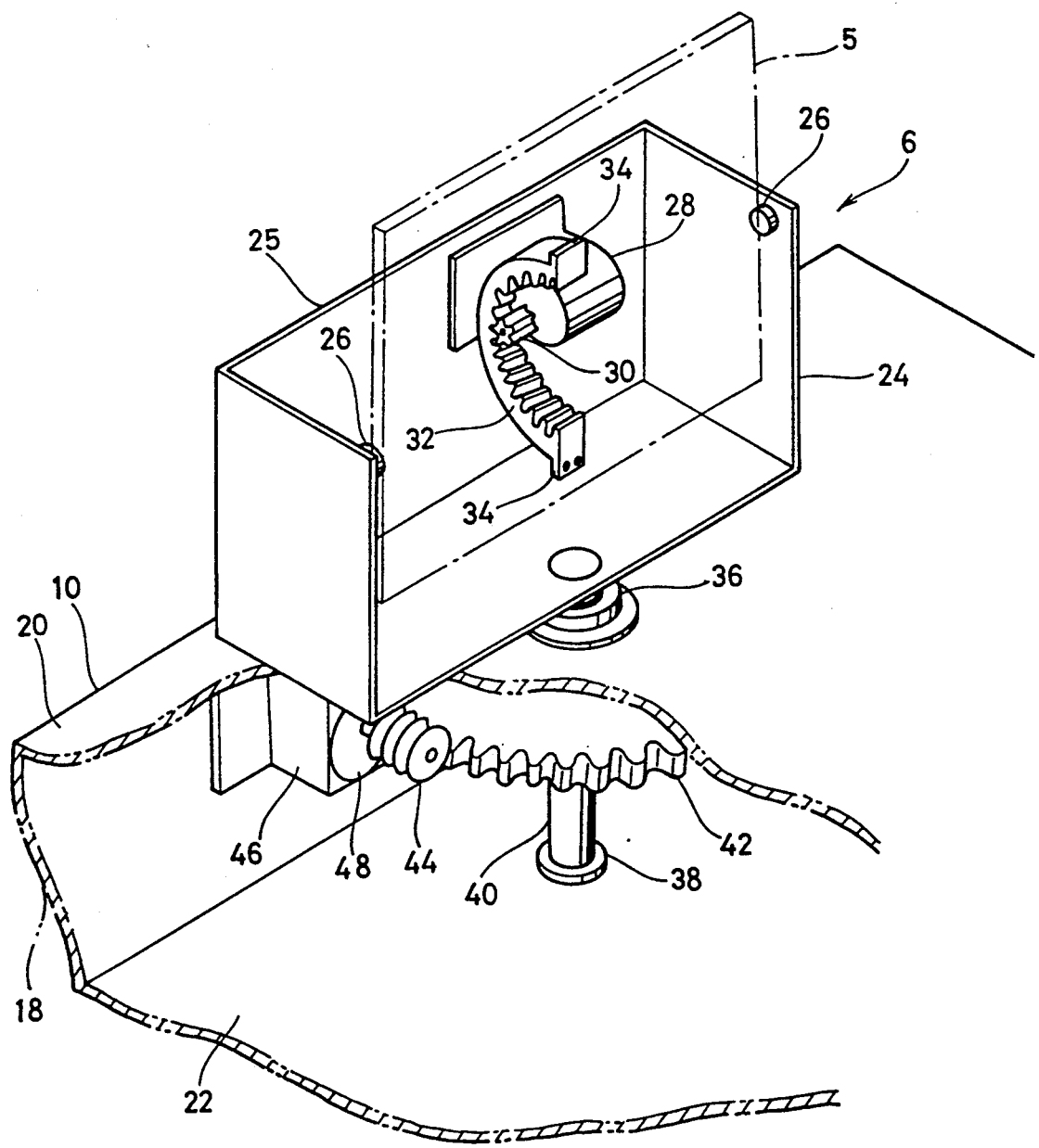
FIG. 7 is a perspective view showing a partial section of the apparatus shown in FIG. 6.

With reference to FIG. 7, the mirror rotating device 6 includes a shaft 40 rotatably supported at a top board 20 and a base board 22 of the frame 10 by bearings 36 and 38, respectively, a gear 42 fixed to the shaft 40, and a motor 48 fixed to the inner surface of a side board 18 of the frame 10 by an attachment member 46. A worm gear 44 is fixed to the rotation axis of the motor 48 and the worm gear 44 engages with the gear 42. The mirror supporting frame 24 supports the central portion of each side of the mirror 5 by means of a pair of bearings 26. A semicircular internal gear 32 is fixed to the back surface of the mirror 5 by means of an attachment portion 34. A motor 28 is fixed to the inner surface of a back board 25 of the mirror supporting frame 24. A pinion 30 is attached to the tip of the rotation axis of the motor 28. The pinion 30 engages with the internal gear 32.

With reference to FIGS. 6 and 7, operation of the mechanical structure of the apparatus will be described. The light emitting portion 1 emits a light 8 with a predetermined wavelength, for example. The light 8 is reflected by the spherical reflective portion 4 of the three-dimensional mouse 3. Part of the reflected light directly enters the light receiving portion 2. The remaining part of the reflected light is reflected by the mirror 5 and the reflected light enters the light receiving portion 2. The apparatus specifies coordinates of the spherical reflective portion 4 on the principle of trigonometrical survey based on two images of the spherical reflective portion 4 formed by the light incident onto the light receiving portion 2.

The mirror 5 operates as follows so as to always allow the reflected light from the spherical reflective portion 4 to reach the light receiving portion 2. With reference to FIG. 7 in particular, a drive of the motor 48 rotates the worm gear 44, the gear 42 and shaft 40. As the shaft 40 rotates, the mirror supporting frame 24 is also rotated around the center axis of the shaft 40. The center axis of the shaft 40 is perpendicular to the top board 20 of the frame 10. The motor 48 is stopped when the rotation angle of the mirror supporting frame 24 takes a desired value.

Further drive of the motor 28 rotates the pinion 30. As the pinion 30 rotates, the internal gear 32 is rotated and the mirror 5 is also rotated around the axis defined by the pair of bearings 26. When the rotation angle of the mirror 5 around the axis defined by the bearing 26 takes the predetermined value, the motor 28 is stopped. Thus, the light from the spherical reflective portion 4 is allowed to enter the light receiving portion 2 by rotating the mirror 5 around the axis perpendicular to the top board 20 and around the axis in parallel with the top board 20 by desired angles, respectively. The above-described angular positions of the mirror 5 about the two axes will be described in detail later.

Figure 8:
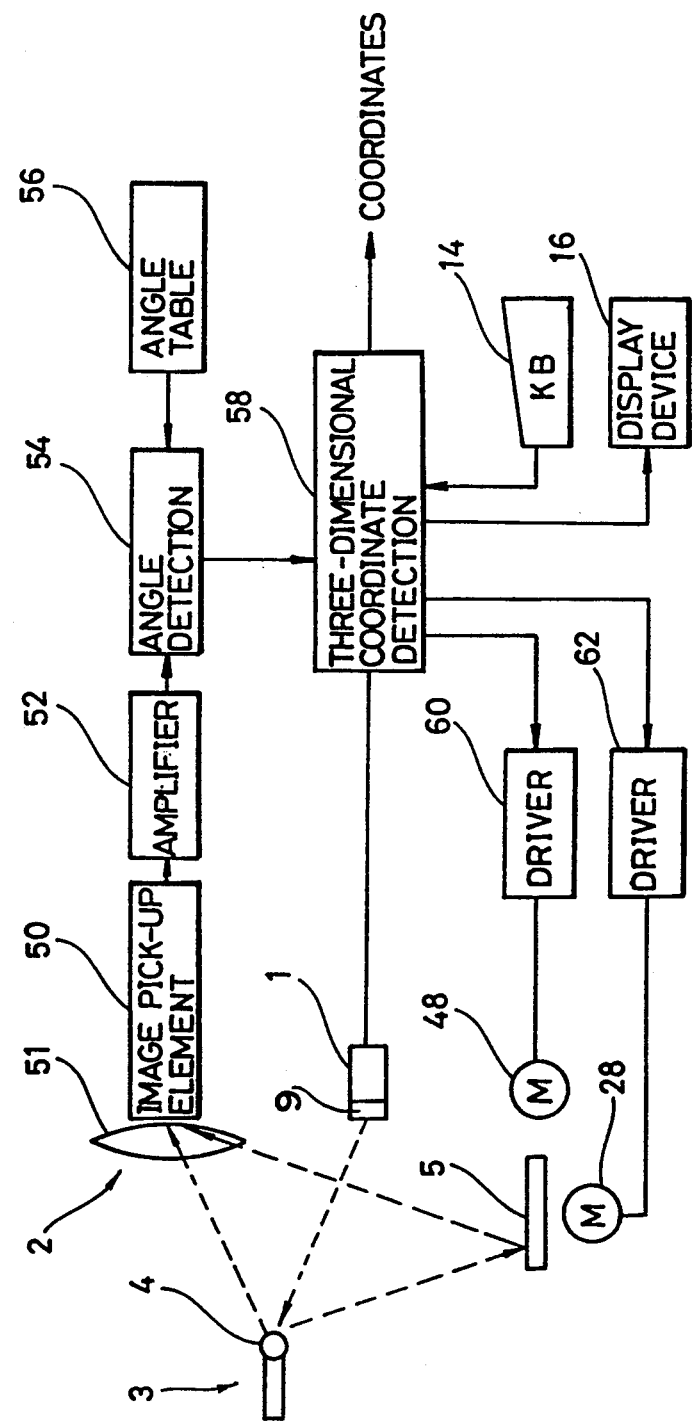
FIG. 8 is a system block diagram of the apparatus shown in FIG. 6.

FIG. 8 is a block diagram of a control system according to the first embodiment. With reference to FIG. 8, the system includes an optical system 51 and an image pick-up element 50 disposed on the light receiving portion 2, an amplifier 52 for amplifying the output of the image pick-up element 50, an angle detection unit 54 for detecting an angle of an incident light on the light receiving portion 2 based on the output of the amplifier 52, a ROM 56 for storing an angle table for use in detecting an angle, a three-dimensional coordinate detection circuit 58 for detecting spatial coordinates of the spherical reflective portion 4 of the three-dimensional mouse 3 based on the output of the angle detection circuit 54, a light emitting diode 9 provided at the light emitting portion 1, and drivers 60 and 62 for driving the motors 48 and 28, respectively, to rotate the mirror 5 based on the output of the three-dimensional coordinate direction circuit 58. The three-dimensional coordinate detection unit 58 is connected to the above-described keyboard 14 and display device 16.

Figure 9:
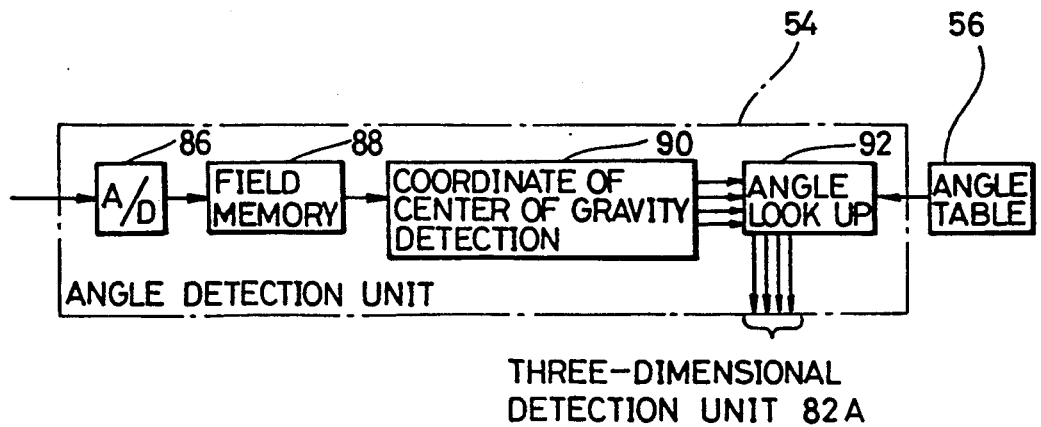
FIG. 9 is a block diagram showing an angle detection unit in more detail.

With reference to FIG. 9, the angle detection unit 54 includes an A/D converter 86 for converting a video signal output from the amplifier 52 into a digital signal, a field memory 88 for storing one field of video signals converted into digital signals, a coordinate of the center of gravity detection circuit 90 for outputting coordinate data indicative of a position of center of gravity of the image of the spherical reflective portion 4 on the field memory 88 based on the video signal stored in the field memory 88, and an angle look up circuit 92 for detecting an angle of an incident light based on the output of the coordinate of the center of gravity detection circuit 90 with reference to the angle table ROM 56.

Figure 10:
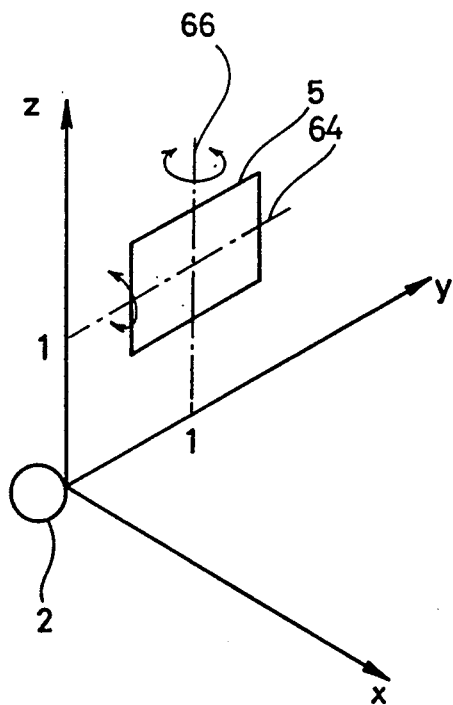
FIG. 10 is a schematic diagram showing an arrangement of a mirror according to the present invention.

The principle of a three-dimensional coordinate detection by the system shown in FIGS. 8 and 9 will be described with reference to FIGS. 10 to 12. With reference to FIG. 10, it is assumed that orthogonal three-dimensional coordinates (x, y and z) exist in space. The light receiving portion 2 (that is, a station point) is placed at the original position. The mirror 5 is placed to have its center at the coordinates (0, 1, 1). The mirror 5 is rotatable centered around a straight line 66 defined by equation y=1 and a straight line 64 defined by equation z=1 both on the yz plane because of such mechanism of the mirror as shown in FIG. 7.

Figure 11:
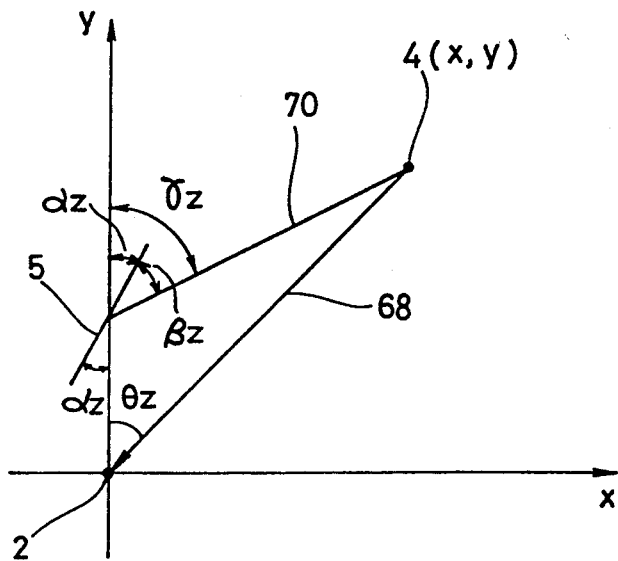
FIG. 11 is a schematic diagram showing the principle on which coordinates (x, y) are computed.
Figure 12:
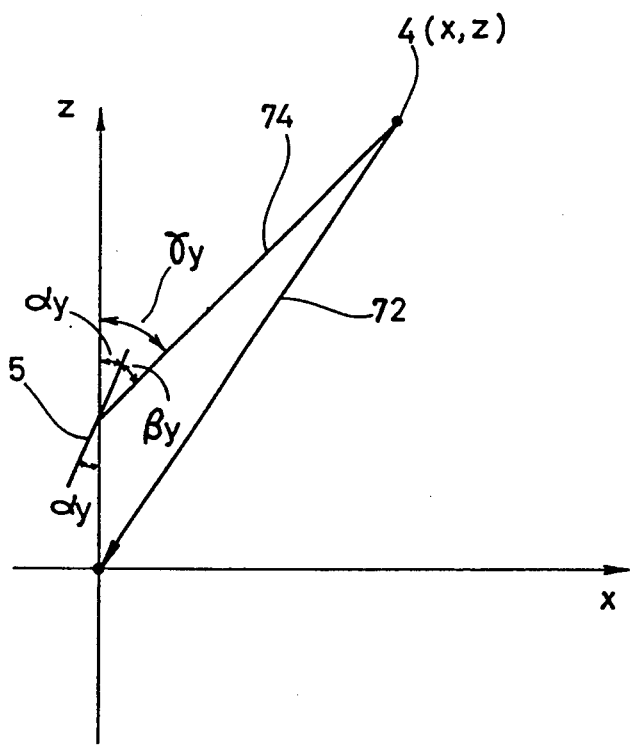
FIG. 12 is a schematic diagram showing the principle on which coordinates (x, z) are computed.

It is assumed herein that part of a reflected light from the spherical reflective portion 4 is reflected by the mirror 5 and the reflected light reaches the light receiving portion 2 as shown in FIGS. 11 and 12 as a result of the rotation of the mirror 5 around the axes 66 and 64 by the angles $\alpha_Z$ and $\alpha_Y$, respectively. In FIGS. 11 and 12, polygonal lines 70 and 74 are projections of the light arriving at the light receiving portion 2 from the spherical reflective portion 4 through the mirror 5 onto the xy plane and the xz plane, respectively. Straight lines 68 and 72 are projections of the light directly arriving at the light receiving portion 2 from spherical reflective portion 4 onto the xy plane and the xz plane, respectively.

In FIG. 11, a supplementary angle with respect to the incident angle of the incident light on the mirror 5 is represented as $\beta_Z$. As described above, the mirror 5 is at an angle of $\alpha_Z$ with the axis y. With the angle of incident of the light reflected by the mirror 5 equal to the angle of reflection of the same, their supplementary angles $\beta_Z$ and $\alpha_Z$ become equal to each other. In FIG. 11, therefore, the angle $\gamma_Z$ of the polygonal line 70, a part from the spherical reflective portion 4 to the mirror 5, to the Y axis becomes twice $\alpha_Z$. With x and y respectively representing a x coordinate and a y coordinate of the spherical reflective portion 4 as shown in FIG. 11, the following equation is established.

$$y = x\tan\left(\frac{\pi}{2} - 2\alpha_z\right) + 1 = x/\tan 2\alpha_z + 1 \quad (1)$$

With $\theta_Z$ representing the angle of the straight line 68 to the y axis, the following equation (2) will be established.

$$y = x\tan\left(\frac{\pi}{2} - \theta_z\right) = x/\tan\theta_z \quad (2)$$

The following equations (3) and (4) will be established based on equations (1) and (2).

$$x = \frac{\tan 2\alpha_z \tan\theta_z}{\tan 2\alpha_z - \tan\theta_z} \quad (3)$$

$$y = \frac{\tan 2\alpha_z}{\tan 2\alpha_z - \tan\theta_z} \quad (4)$$

The x coordinate and the y coordinate can be obtained by equations (3) and (4) Similarly, FIG. 12 gives the following equations (5) and (6).

$$x = \frac{\tan 2\alpha_y \tan\theta_y}{\tan 2\alpha_y - \tan\theta_y} \quad (5)$$

$$y = \frac{\tan 2\alpha_y}{\tan 2\alpha_y - \tan\theta_y} \quad (6)$$

Coordinates (x, y, z) can be obtained from the foregoing equations (3)–(6). The x coordinate can be obtained by either of the equations (3) and (5). As the x coordinate, a value obtained from either of the equations, or a mean value, for example, of the values obtained by these equations may be used.

In equations (3) to (6), each of $\alpha_Y$ and $\alpha_Z$ can be obtained from the rotation angle of the mirror 5. Each of $\theta_y$ and $\theta_z$ can be specified based on coordinates of the center of gravity of the image of the spherical reflective portion 4 on the image obtained by the image pick-up element with reference to a previously prepared table.

The system shown in FIGS. 8 and 9 operates as follows. The light emitting diode 9 emits a light under the control of the three-dimensional coordinate detection unit 58. The light is reflected by the spherical reflective portion 4. A part of the reflected light directly enters the image pick-up element 50. The remaining part of the reflected light is reflected by the mirror 5 and the reflected light reaches the image pick-up element 50. It is assumed in this case that the mirror 5 has its posture adjusted to allow a reflected light to reach the image pick-up element 50.

The optical system 51 provided on the image pick-up element 50 forms two images of the spherical reflective portion 4 on a light receiving plane of the image pick-up element 50. One of the two images is formed by a direct incident light and the other is formed by an incident light reflected by the mirror 5.

The image pick-up element 50 includes a plurality of light receiving elements disposed on the image plane. Each light receiving element stores electric charges according to the intensity of the incident light to sequentially output the same in predetermined timing. The output signal is amplified by the amplifier 52 and applied to the angle detection unit 54.

With reference to FIG. 9, the video signal is converted into a digital signal by the A/D converter 86. The field memory 88 stores the image of one field as a digital signal by storing the outputs of the A/D converter 86 in the sequential addresses.

The coordinate of the center of the gravity detection circuit 90 detects the coordinates of the center of the gravities of the two images of the spherical reflective portion 4 based on the image signals stored in the field of memory 88 and outputs the values of two pairs of plane coordinates indicative of a position on the field memory 88.

The angle look up circuit 92 searches the angle table ROM 56 by using an applied pair of coordinates as keys to find a corresponding angle and applies the angle to the three-dimensional detection unit 82A. With two pairs of coordinates applied, the angle look up circuit 92 outputs two angles $\theta_Y$ and $\theta_Z$ for use in equations (3)–(6). It should be noted that a plurality of pairs of coordinate positions of the image on the field memory 88 and an incident angle to an object should be stored in advance in the angle table ROM 56 in the form of a table. Theoretically, the incident angle can be also obtained directly from the coordinates of the image. However, it is simpler to prepare a table in advance.

Again with reference to FIG. 8, the three-dimensional coordinate detection unit 58 calculates the above-described equations (3) to (6) based on the two angles $\theta_Y$ and $\theta_Z$ applied from the angle detection circuit 54 and the angles $\alpha_y$ and $\alpha_z$ of the mirror 5 previously set by the drivers 60 and 62 and the motors 48 and 28 to obtain spatial coordinates (x, y, z) of the spherical reflective portion 4 and applies the coordinates to the host system.

The keyboard 14 and the display device 16 are used in, for example, setting an original position of spatial coordinates and key calibration.

Figure 13:
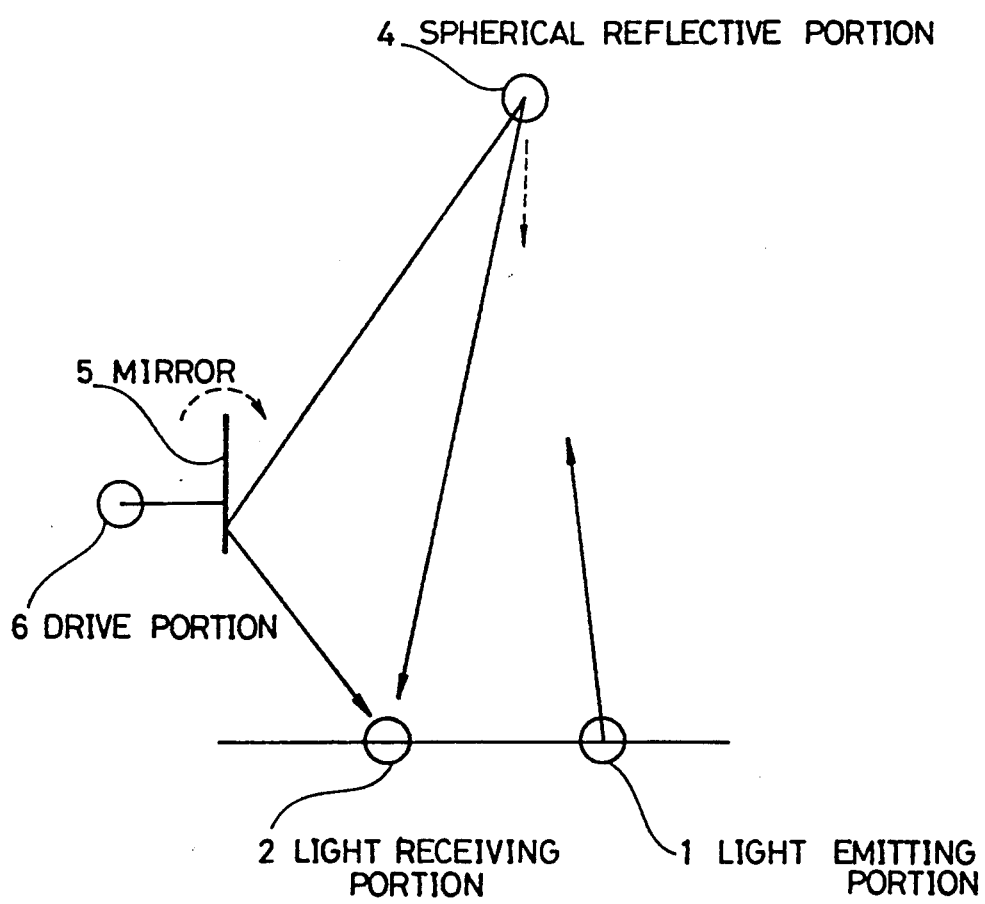
FIG. 13 is a schematic diagram showing the principle of driving a mirror.

The motors 48 and 28 are driven in a manner described below. With reference to FIG. 13, when the spherical reflective portion 4 moves downward, the reflection point on the mirror is also moved downward. In this case, the mirror is rotated by the mirror rotating device 6 so as to follow the movement of the reflection point. Such rotation of the mirror 5 enables the reflection point to be always located at the central portion of the mirror 5. The rotation angle of such mirror 5 is controlled individually for the two rotation axes.

Figure 1:
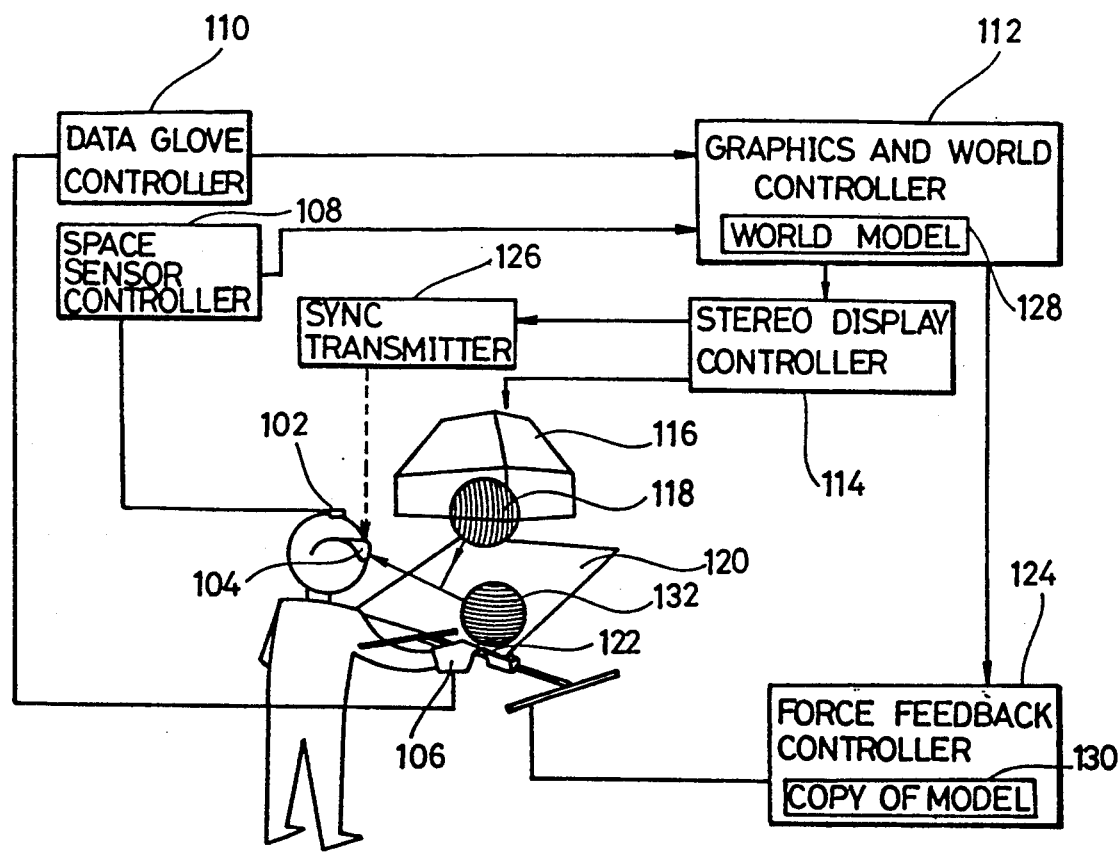
FIG. 1 is a block diagram showing a virtual reality system.
Figure 2:
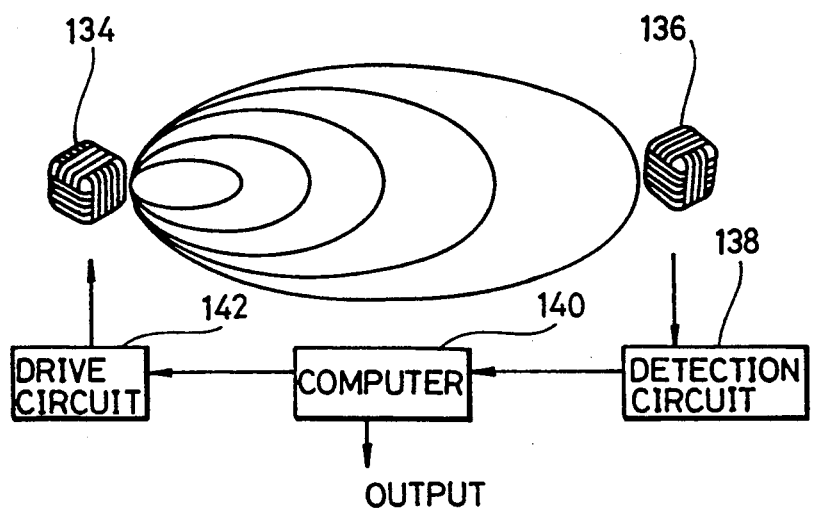
FIG. 2 is a schematic diagram showing one example of a conventional system for detecting position.
Figure 3:
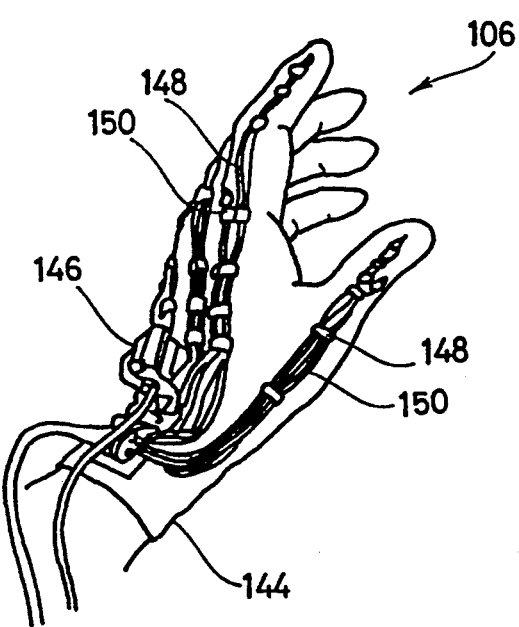
FIG. 3 is a perspective view showing a data glove.
Figure 4:
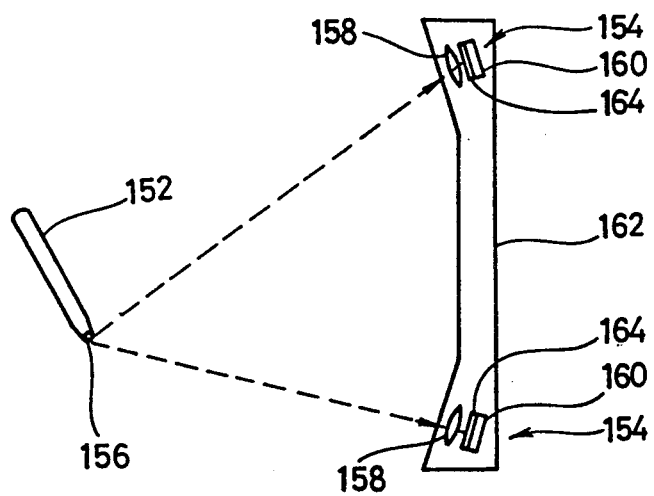
FIG. 4 is a schematic diagram showing a conventional space position detecting system on the principle of trigonometrical survey.

As described above, the apparatus according to the first embodiment enables calculation of the three-dimensional coordinates of the spherical reflective portion 4 of the three-dimensional mouse 3. As compared with a conventional system shown in FIG. 4, the apparatus according to the first embodiment requires no light emitting portion to be provided in the three-dimensional mouse 3. As a result, the three-dimensional mouse 3 itself can be made light in weight and compact in size. In addition, the use of the mirror 5 allows one image pick-up element 50 to obtain three-dimensional coordinates on the principle of trigonometrical survey. As a result, the system is made simpler as compared with a conventional system using two light receiving elements, while the structure of the system, a process of changing a distance between light receiving elements as a basis of the trigonometrical survey, for example, can be made simple as compared with a conventional system. Furthermore, the mirror 5 rotatable around two axes as the present embodiment enables coordinates of an arbitrary point to be found in a wider space. As previously described, the mirror 5 may be fixed or may be rotatable around only one axis. In the above-described embodiment, the central portion of the mirror 5 is always located at one point of the space. The present invention is not limited thereto but the mirror 5 itself may be shifted. In this case, it is necessary to detect a shift amount of the mirror 5 etc.

The light emitting portion 1 emits a light having a specific frequency such as an infrared light and in some cases it emits an electromagnetic wave. Then, a reflected light is identified according to a material of the spherical reflective portion 4. Three-dimensional coordinates of an arbitrary point can be obtained in entire space of a room, for example, by fixing other parts than the three-dimensional mouse to a ceiling, a wall and a desk etc. in the room.

Figure 14:
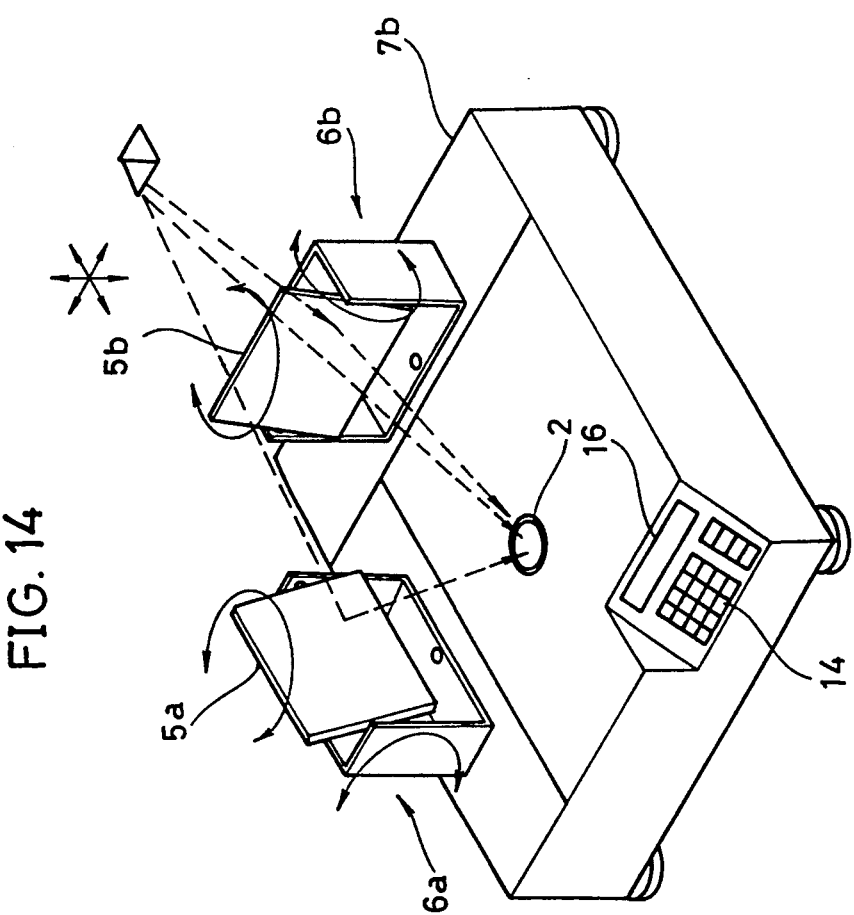
FIG. 14 is a perspective view of an apparatus according to a second embodiment of the present invention.

FIG. 14 is a perspective view of an apparatus according to a second embodiment of the present invention. The apparatus shown in FIG. 14 differs from the apparatus according to the first embodiment shown in FIG. 6 in that the apparatus is not provided with the light emitting portion 1 shown in FIG. 6 and is provided with two mirrors 5a and 5b and two mirror rotating devices 6a and 6b disposed on a frame 76 in place of one mirror 5 and one mirror rotating device 6. The same reference numerals are given to the same parts in FIGS. 6 and 7 and FIG. 14. Functions thereof are also the same. No detailed description will be therefore repeated.

The apparatus according to the second embodiment shown in FIG. 14 includes an additional mirror as compared with that of the first embodiment. Therefore, the same operations as in the first embodiment can be performed for each mirror to obtain two pairs of measured values. It is possible to detect coordinates with higher precision than by the apparatus of the first embodiment by calculating a mean value of the two pairs of measured values and setting the mean value as a coordinate position.

FIG. 15 is a block diagram of a control system of the apparatus according to the second embodiment. With reference to FIG. 15, the control system differs from that shown in FIG. 8 in that it includes four motors 28a, 28b, 48a and 48b and four drivers 60a, 60b, 62a and 62b in place of the motors 28 and 48 and the drivers 60 and 62, two mirrors 5a and 5b in place of one mirror 5, an angle detection unit 78 for detecting two pairs of angles $\theta_Y$ and $\theta_Z$ based on data obtained by the two mirrors in place of the angle detection unit 54 for detecting only one pair of angles $\theta_Y$ and $\theta_Z$ shown in equations (3)–(6) and a three-dimensional coordinate detection unit 82 for detecting and outputting three-dimensional coordinates of a body 84 based on two pairs of angles $\theta_Y$ and $\theta_Z$ and two pairs of rotation angles $\alpha_y$ and $\alpha_z$ of the two mirrors 5a and 5b in place of the three-dimensional coordinate detection unit 58. In addition, the system does not include the light emitting diode 9 as shown in FIG. 8.

The apparatus according to the second embodiment shown in FIGS. 14 and 15 carries out the same calculation as that of the first embodiment by using an image formed by a light directly entering the image pick-up element 50 from the body 84 and images respectively formed by the lights reflected by the mirrors 5a and 5b. The three-dimensional coordinate detection unit 82 outputs a pair of three-dimensional coordinate values by obtaining a mean value of each coordinate from thus obtained two pairs of three-dimensional coordinate values and the like.

The apparatus according to the second embodiment does not include the light emitting portion 1. However, in a sufficiently light surrounding environment, necessary information can be obtained from image picked up by the image pick-up element 50. Since no light emitting portion is required, it is possible to obtain three-dimensional coordinate values of the body 84 even if a light emitted from a light emitting portion is intercepted by other bodies and fails to reach a measurement target. In addition, even if a reflected lights from one of the two mirrors 5a and 5b is intercepted by other bodies, the light from the other mirror enables detection of coordinates of the body. Since the apparatus, unlike one of the conventional apparatuses, does not detect a magnetic field change by a detection of three-dimensional coordinates, measurement precision is not adversely affected by a metallic body etc. existing in a measurement space.

The number of mirrors is not limited to two but it may be plural. In addition, some of mirrors may be fixed, while only the other mirrors may be rotatable.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for specifying three-dimensional coordinates of a body including:

image position sensing means for converging incident light radiated from said body arranged in a predetermined region of a three-dimensional space to form an image on a predetermined plane and detecting a position of said image on said predetermined plane, reflecting means for reflecting the light radiating from said body to allow the reflected light to enter said image position sensing means, and coordinate calculating means for calculating coordinates of said body in a three-dimensional coordinate system defined in said three-dimensional space based on a position, on said predetermined plane, of an image formed by a direct incident light radiated from said body and directly entering said image position sensing means, and a position, on said predetermined plane, of an image formed by an indirect incident light radiated from said body and reflected by said reflecting means and entering said image position sensing means.

2. The apparatus according to claim 1, wherein said incident light radiated from said body includes visible light.

3. The apparatus according to claim 2, further including:

first holding means for holding said reflecting means for rotation around a first axis, and first angle detecting means for detecting a rotation angle of said reflecting means around said first axis, wherein said coordinate calculating means further calculates said coordinates based on the rotation angle of said first angle detecting means.

4. The apparatus according to claim 3, further including:

second holding means for holding said reflecting means for rotation around a second axis not parallel with said first axis, and second angle detecting means for detecting a rotation angle of said reflecting means around said second axis, wherein said coordinate calculating means further calculates said coordinates based on the rotation angle of said second angle detecting means.

5. The apparatus according to claim 3, further including first rotating means responsive to an output of said image position sensing means for rotating said reflecting means around said first axis such that the visible light radiating from said body and entering said image position sensing means via said reflecting means has a reflection point on said reflecting means near said first axis.

6. The apparatus according to claim 4, further including first rotating means responsive to an output of said image position sensing means for rotating said reflecting means around said first axis such that the visible light radiating from said body and entering said image position sensing means via said reflecting means has a reflection point on said reflecting means near said first axis.

7. The apparatus according to claim 6, further including second rotating means responsive to the output of said image position sensing means for rotating said reflecting means around said second axis such that the visible light radiating from said body and entering said image position sensing means via said reflecting means has the reflection point on said reflecting means near said second axis.

8. The apparatus according to claim 1, further including a plurality of said reflecting means.

9. The apparatus according to claim 8, wherein said incident light radiated from said body includes visible light.

10. The apparatus according to claim 9 further including:

first holding means for holding a first of said plurality of said reflecting means for rotation around a first axis, and first angle detecting means for detecting a rotation angle of said first of said plurality of said reflecting means around said first axis, wherein said coordinate calculating means further calculates said coordinates based on the rotation angle of said first angle detecting means.

11. The apparatus according to claim 10, further including:

second holding means for holding said first of said plurality of said reflecting means for rotating around a second axis not parallel with said first axis, and second angle detecting means for detecting a rotating angle of said first of said plurality of said reflecting means around said second axis, wherein said coordinate calculating means further calculates said coordinates based on the rotation angle of said second angle detecting means.

12. The apparatus according to claim 10, further including first rotating means responsive to an output of said image position sensing means for rotating said first of said plurality of said reflecting means around said first axis such that the visible light radiating from said body and entering said image position sensing means via said first of said plurality of said reflecting means has a reflecting point on said first of said plurality of reflecting means near said first axis.

13. The apparatus according to claim 11, further including first rotating means responsive to an output of said image position sensing means for rotating said first of said plurality of said reflecting means around said first axis such that the visible light radiating from said body and entering said image position sensing means via said first of said plurality of said reflecting means has a reflection point on said first of said plurality of said reflecting means near said first axis.

14. The apparatus according to claim 13, further including second rotating means responsive to the output of said image position sensing means for rotating said first of said plurality of said reflecting means around said second axis such that the visible light radiating from said body and entering said image position sensing means via said first of said plurality of said reflecting means has the reflection point on said first of said plurality of said reflecting means near said second axis.

15. The apparatus according to claim 11, further including radiating means for radiating the incident light with a predetermined wavelength in said predetermined region.

16. The apparatus according to claim 15, further including a position designating member placed at an arbitrary position in said predetermined region, said position designating member including a portion with a curved surface for reflecting incident light.

17. The apparatus according to claim 1, wherein said coordinate calculating means includes:

incident angle detecting means for detecting an angle of incidence of the direct incident light radiating from said body and the indirect incident light radiating from said body, and wherein said coordinate calculating means calculates the coordinates of said body in said three-dimensional coordinate system utilizing a predetermined equation based on the angle of incidence from said incident angle detecting means and data specifying a positional relationship between said reflecting means and said image position sensing means.

18. The apparatus according to claim 17, wherein said incident angle detecting means includes:

image coordinate detecting means for detecting coordinates of the direct image and the indirect image formed on said predetermined plane in said three-dimensional coordinate system, table storing means for storing relationships between the coordinates of the direct image and the indirect image in said three-dimensional coordinate system and an angle of light incident to the direct image and the indirect image, respective, and table referring means for referring to said table storing means to obtain an angle of incidence of incident light utilizing the coorindates from said image coordinate detecting means as a key.

* * * * *